(12) United States Patent
Apfel

(10) Patent No.: US 7,181,002 B2
(45) Date of Patent: Feb. 20, 2007

(54) METHOD AND APPARATUS FOR A SINGLE POWER SUPPLY FOR DUAL POWER MODE

(75) Inventor: Russell J. Apfel, Austin, TX (US)

(73) Assignee: Legerity, Inc., Austin, TX (US)

( * ) Notice: Subject to any disclaimer, the term of this patent is extended or adjusted under 35 U.S.C. 154(b) by 494 days.

(21) Appl. No.: 10/384,296

(22) Filed: Mar. 7, 2003

(65) Prior Publication Data
US 2004/0174992 A1 Sep. 9, 2004

(51) Int. Cl.
H04M 19/00 (2006.01)
(52) U.S. Cl. ...................... 379/413; 379/324
(58) Field of Classification Search .......... 379/413, 379/413.01, 418, 252, 400, 395.01
See application file for complete search history.

(56) References Cited

U.S. PATENT DOCUMENTS 5,535,273 A * 7/1996 Kausel et al. .......... 379/399.01
6,690,792 B1 * 2/2004 Robinson et al. .......... 379/418

* cited by examiner

Primary Examiner—Sinh Tran
Assistant Examiner—Walter F Briney, III
(74) Attorney, Agent, or Firm—Williams, Morgan & Amerson, P.C.

(57) ABSTRACT

A method and apparatus is provided for using a single power supply in a dual mode fashion. A ringing signal is received. A waveform power supply signal based upon the ringing signal. An unbalanced output buffering function upon the signal to be conditioned using an unbalanced buffering circuit. Performing the unbalanced output buffering function includes switching between a plurality of power levels of the waveform power supply signal to maintain a predetermined maximum voltage across a plurality of devices relating to the unbalanced buffering circuit.

23 Claims, 8 Drawing Sheets

METHOD AND APPARATUS FOR A SINGLE POWER SUPPLY FOR DUAL POWER MODE

BACKGROUND OF THE INVENTION

1. Field of the Invention

This invention relates generally to telecommunications, and, more particularly, to providing a power amplifier configuration to implement a signal power supply for a dual power mode circuit.

2. Description of the Related Art

In communications systems, particularly telephony such as a Plain Old Telephone System (POTS), it is common practice to transmit signals between a subscriber station and a central switching office via a two-wire, bi-directional communication channel. A line card generally connects the subscriber station to the central switching office. The functions of the line card include supplying talk battery, performing wake-up sequences of circuits to allow communications to take place, and the like. Voltage signals are processed and conditioned when being driven onto telecommunication lines.

POTS was designed primarily for voice communication, and thus provides an inadequate data transmission rate for many modern applications. To meet the demand for high-speed communication, designers have sought innovative and cost-effective solutions that would take advantage of the existing network infrastructure. Several technological solutions proposed in the telecommunications industry use the existing network of telephone wires. A promising one of these technologies is the Digital Subscriber Line (xDSL or DSL) technology.

xDSL is making the existing network of telephone lines more robust and versatile. Once considered virtually unusable for broadband communications, an ordinary twisted pair equipped with DSL interfaces can transmit video, television, and very high-speed data. The fact that more than six hundred million telephone lines exist around the world is a compelling reason for these lines to be used as the primary transmission conduits for at least several more decades. Because DSL utilizes telephone wiring already installed in virtually every home and business in the world, it has been embraced by many as one of the more promising and viable options.

There are now at least three popular versions of DSL technology, namely Asymmetrical Digital Subscriber Line (ADSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL and POTS technologies can co-exist in one line (e.g., also referred to as a "subscriber line"). Traditional analog voice band interfaces use the same frequency band, 0–4 Kilohertz (KHz), as telephone service, thereby preventing concurrent voice and data use. A DSL interface, on the other hand, operates at frequencies above the voice channels, from 25 KHz to 1.1 Megahertz (MHz). Thus, a single DSL line is capable of offering simultaneous channels for voice and data. It should be noted that the standards derivatives of ADSL are still in definition as of this writing, and therefore are subject to change.

DSL systems use digital signal processing (DSP) to increase throughput and signal quality through common copper telephone wire. It provides a downstream data transfer rate from the DSL Point-of-Presence (POP) to the subscriber location at speeds of up to 1.5 megabits per second (MBPS). The transfer rate of 1.5 MBPS, for instance, is fifty times faster than a conventional 28.8 kilobits per second (KBPS) transfer rate typically found in conventional POTS systems.

DSL systems generally employ a signal detection system that monitors the telephone line for communication requests. More specifically, the line card in the central office polls the telephone line to detect any communication requests from a DSL data transceiver, such as a DSL modem, located at a subscriber station. There are multiple types of signals that are received and transmitted over multiple signal paths during telecommunication operation. Many times it is advantageous to transmit signals in a voltage format, so as to reduce transmission power consumption.

Executing a ringing cycle in telephones has always been one of the more challenging and costly functions for Subscriber Line Interface Equipment. The traditional methods employed by telephone exchanges generally have been based on a high voltage AC ringing signal with a large DC offset voltage. The AC signal was used to ring a mechanical bell and needed to provide enough power (current and voltage) to the ringer. The DC offset was used to detect ring trip, i.e., a subscriber picking up the telephone, and to turn off the ringing signal (for safety reasons as well as to switch from the ring mode to the talk mode).

The DC offset voltage is used to detect ring trip. When the phone is on the hook and ringing, there is no DC path and the DC current is zero. When the phone is off the hook, AC and DC current flows so the traditional method of detecting that the telephone is off the hook is to sense the DC current and compare it to a threshold. The AC signal is generally filtered or canceled in order to provide the ability to measure the DC current. Generally, the larger the DC current, the easier this task is. The DC offset has traditionally been −48 Volts (the battery voltage) because it is relatively easy to generate and provides enough DC current to perform an efficient ring trip detection.

Ringing functions have been implemented in an unbalanced manner, which refers to applying a ringing waveform to one of the two leads (Tip lead or Ring lead), but not to both. One of the most common ringing method calls for providing battery backed ringing on the Ring lead (AC plus −48 Volts DC offset) and holding the Tip lead near ground. The other configuration provides for reversing battery ringing where the Tip lead has a −48 Volts DC offset and the AC signal is placed on the ring lead.

The unbalanced ringing signal typically swings from near −200V to near +100V for battery backed ringing. This 300V differential has proven to be very difficult for integrated circuit (IC) technologies. Providing IC devices that can withstand 300 Volts generally proves to be costly and inefficient. Silicon providers have tried to eliminate usage ringing relays by providing a ringing signal through devices in the line card. However, due to high voltage requirements, no practical application has been able to implement unbalanced ringing through a device in a line card. Instead, the electronic solutions have been based on a technique called balanced ringing. In the balanced ringing solution, the AC signal is applied as in-phase, and 180 degrees out of phase signals to the Tip and Ring leads. In this manner, the peak AC signal can approach the total supply voltage, whereas in an unbalanced solution, the total supply must be greater than the peak-to-peak signal. In order to supply 85 Volts(rms), which has about a 125 Volts peak signal, an unbalanced ringing device in the line card requires a supply voltage greater than 250V. However, the supply voltage must also support the DC offset. An unbalanced system does not require any more voltage as long as the DC offset is less than the AC peak signal. In contrast, a balanced system requires a supply that is greater than the AC peak plus the DC offset, thereby creating an enormous design and operation burden.

Silicon technologies in the range of 150 to 170 Volts are generally being used to build ringing devices. In order to support high AC signals, the DC offset has been reduced in these solutions. For instance, if a 150 Volt supply is used, and a ringing signal of 125 Volt peak is required, there are 25 Volts left for the device-overhead and the DC offset. This forces the usage of a low DC offset to perform ring trip detection and requires costly filtering due to the low DC offset. Therefore, it is desirable to provide an offset of close to 50 Volts, which would require a minimum supply voltage of 185 Volts. Assuming 3% supply tolerance, the supply voltage range would have to be 191 Volts (+/−5 Volts) or 197 Volts maximum. The silicon used to produce the line card devices would have to be able to handle over 200 Volts to take into account transient and surges on the power supply. The state-of-the-art technology in the industry generally does not provide a device that can handle this high voltage. Additionally, the balanced ringing device generally dissipates more power than the ring generator due to the DC supplies and overhead voltage. The ringing device also requires more complex protection circuit than standard devices, which can increase cost. Additionally, efficient operation of devices in the line card may require a plurality of power supplies that may be difficult to generate.

The present invention is directed to overcoming, or at least reducing the effects of, one or more of the problems set forth above.

SUMMARY OF THE INVENTION

In one aspect of the present invention, a method is provided for using a single power supply in a dual mode fashion. A ringing signal is received. A waveform power supply signal based upon the ringing signal is generated. An unbalanced output buffering function is performed upon the signal to be conditioned using an unbalanced buffering circuit. Performing the unbalanced output buffering function includes switching between a plurality of power levels of the waveform power supply signal to maintain a predetermined maximum voltage across a plurality of devices relating to the unbalanced buffering circuit.

In another aspect of the present invention, an apparatus is provided using a single power supply in a dual mode fashion. The apparatus of the present invention comprises a circuit to provide a waveform power supply signal based upon a ringing signal and a constant power supply. The waveform power supply signal is designed to provide a plurality of power supplies for providing operating voltages for operating a plurality of devices; the circuit comprising a plurality of switches to maintain a predetermined maximum voltage across the devices.

In another aspect of the present invention, a system is provided using a single power supply in a dual mode fashion. The system of the present invention comprises a subscriber line and a line card electronically coupled with the subscriber line. The line card includes: a first amplifier for receiving and conditioning a tip signal; a second amplifier for receiving and conditioning a ringing signal; and a circuit to provide a waveform power supply signal based upon the ringing signal and a constant power supply. The waveform power supply signal is designed to provide a plurality of power supplies for providing operating voltages for operating the first and second amplifiers; the circuit comprising a plurality of switches to maintain a predetermined maximum voltage across the first and second amplifiers.

In yet another aspect of the present invention, a computer readable program storage device encoded with instructions is provided using a single power supply in a dual mode fashion. The computer readable program storage device encoded with instructions that, when executed by a computer, performs a method, which comprises: receiving a ringing signal; providing a waveform power supply signal based upon the ringing signal; and performing an unbalanced output buffering function upon the signal to be conditioned using an unbalanced buffering circuit. Performing the unbalanced output buffering function includes switching between a plurality of power levels of the waveform power supply signal to maintain a predetermined maximum voltage across a plurality of devices relating to the unbalanced buffering circuit.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a ringing subscriber line interface circuit (SLIC) that supports unbalanced ringing with a DC offset. The unbalanced implementation may refer to the AC or ringing signal received by the SLIC being essentially on one of the two leads, i.e., a tip lead or a ring lead, which are strung out to an external telephone set. Therefore, four different combinations that utilize the tip and the ring signals may be used in an unbalanced format. Embodiments of the present invention provide that the unbalanced ringing signal is generally not more than 150 Volts away from any two power supplies that are available to the SLIC. The invention provides for switching power supplies for the SLIC such that the voltage across various devices in the SLIC can be controlled such that it remains within 150 Volts even though the total supply voltage range across the SLIC may be greater than 150 Volts. For example, the total supply voltage of the SLIC may be 265 Volts, however, no device within the SLIC will experience a voltage difference of a 150 Volts.

Embodiments of the present invention also provide for utilizing the ring generator signal to be used as a power supply voltage for the SLIC. During ringing, the ringing signal may be used as a negative power supply to the SLIC through a diode, along with a negative battery being also applied through a diode. Therefore, the negative supply will track the ringing supply when the ringing supply is more negative than the battery supply. The negative supply will be equal to the battery when it is more positive than the battery supply. Similarly, a ground or a ringing supply may be utilized as a positive supply to an amplifier in the SLIC. The positive supply will either be the ringing supply or zero volts, depending on the ringing voltage. The ringing SLIC provided by the present invention may be driven by a signal that tracks the ringing signal but sets its output voltage to a level that is slightly less than its supply voltage. A diode may be used to automatically activate switches that supply the power so that the SLIC voltages are minimized. Utilizing the embodiments provided in the present disclosure, an unbalanced ringing SLIC is provided. Additionally, the present invention provides for implementing devices in the SLIC that are designed to operate at 150 Volts or below.

Although portions of the present invention are described in the context of a line driver circuit for clarity, embodiments of the present invention may be implemented in a variety of circuit configurations for a variety of applications.

Figure 1:
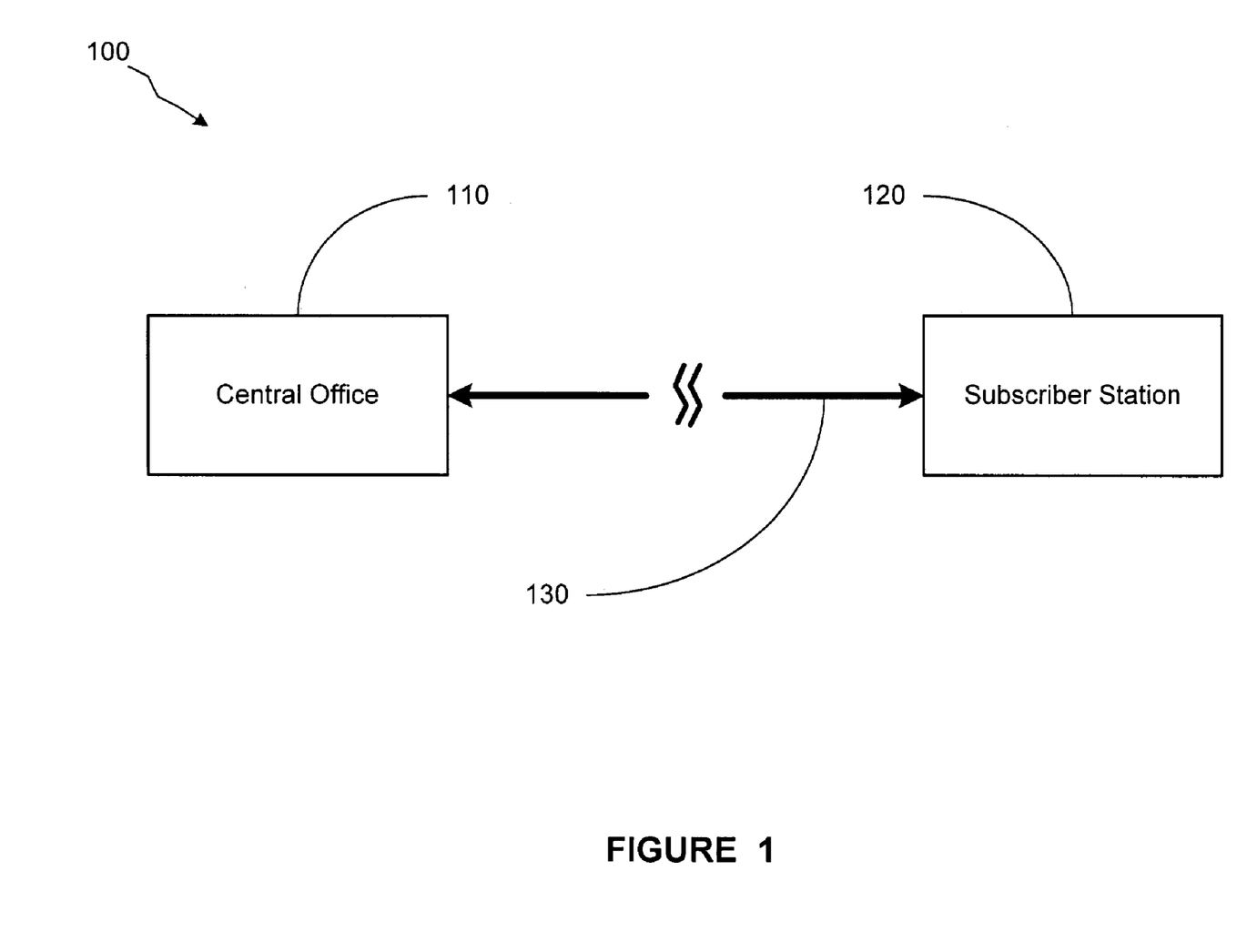
FIG. 1 illustrates a first embodiment of an apparatus in accordance with one illustrative embodiment of the present invention.

Referring now to the drawings and in particular to FIG. 1, an apparatus 100 in accordance with the present invention is illustrated. The apparatus 100 includes a central office 110 that is coupled to a subscriber station 120 via a subscriber line 130. The central office 110 and the subscriber station 120 are capable of sending and receiving a signal comprising a voice and data band. The voice band, as used herein, refers to a POTS voice signal ranging from 0–4 KHz. The data band refers to frequencies above the voice band, and may include, for example, the frequency range employed in xDSL technologies. In one embodiment, the subscriber line 130 may be a Public Switched Telephone Network (PSTN) line, a Private Branch Exchange (PBX) line, or any other medium capable of transmitting signals.

The subscriber station 120 may be a telephonic device capable of supporting pulse dialing. The term "telephonic device," as utilized herein, includes a telephone, or any other device capable of providing a communication link between at least two users. In one embodiment, the subscriber station 120 may be one of a variety of available conventional telephones, such as wired telephones and similar devices. In an alternative embodiment, the subscriber station 120 may be any "device" capable of performing a substantially equivalent function of a conventional telephone, which may include, but is not limited to, transmitting and/or receiving voice and data signals. Examples of the subscriber station 120 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
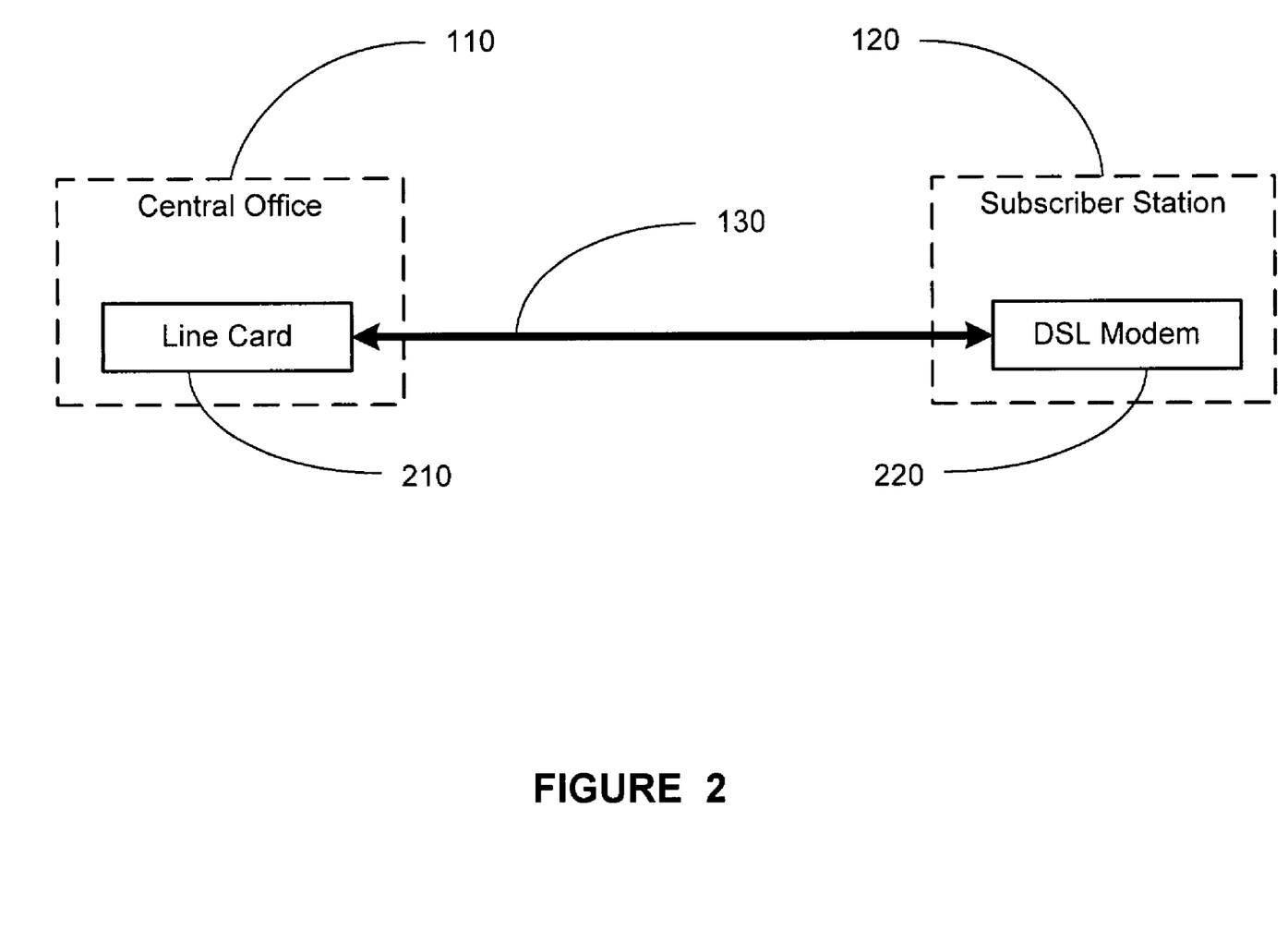
FIG. 2 illustrates an implementation of a line card into the apparatus described in FIG. 1 in accordance with one illustrative embodiment of the present invention.

Turning now to FIG. 2, a line card 210 and a DSL modem 220 are illustrated in accordance with the present invention. In one embodiment, the line card 210, which is integrated into the central office 110, is coupled with the DSL modem 220, which resides within the subscriber station 120. Because voice and/or data can be transmitted on the subscriber line 130, the signal received and transmitted by the line card 210 and the DSL modem 220 may include voice and data band frequencies.

The line card 210 may be located at a central office 110 or a remote location somewhere between the central office 110 and the subscriber station 120 (see FIG. 1). The line card 210 services the subscriber station 120, which in the illustrated embodiment is a telephonic device. The line card 210 is capable of processing DC voltage signals and AC signals. The subscriber line 130 in the instant embodiment is a telephone line. The combination of the telephone device (subscriber station 120) and the telephone line (subscriber line 130) is generally referred to as a subscriber loop.

The line card 210, which may be capable of supporting a plurality of subscriber lines 130, performs, among other things, two fundamental functions: DC loop supervision and DC feed. The purpose of DC feed is to supply enough power to operate the subscriber station 120 at the customer end. The purpose of DC loop supervision is to detect changes in DC load, such as on-hook events, off-hook events, rotary dialing, or any other event that causes the DC load to change. In the interest of clarity and to avoid obscuring the invention, only that portion of the line card 210 that is helpful to an understanding of the invention is illustrated.

Figure 3:
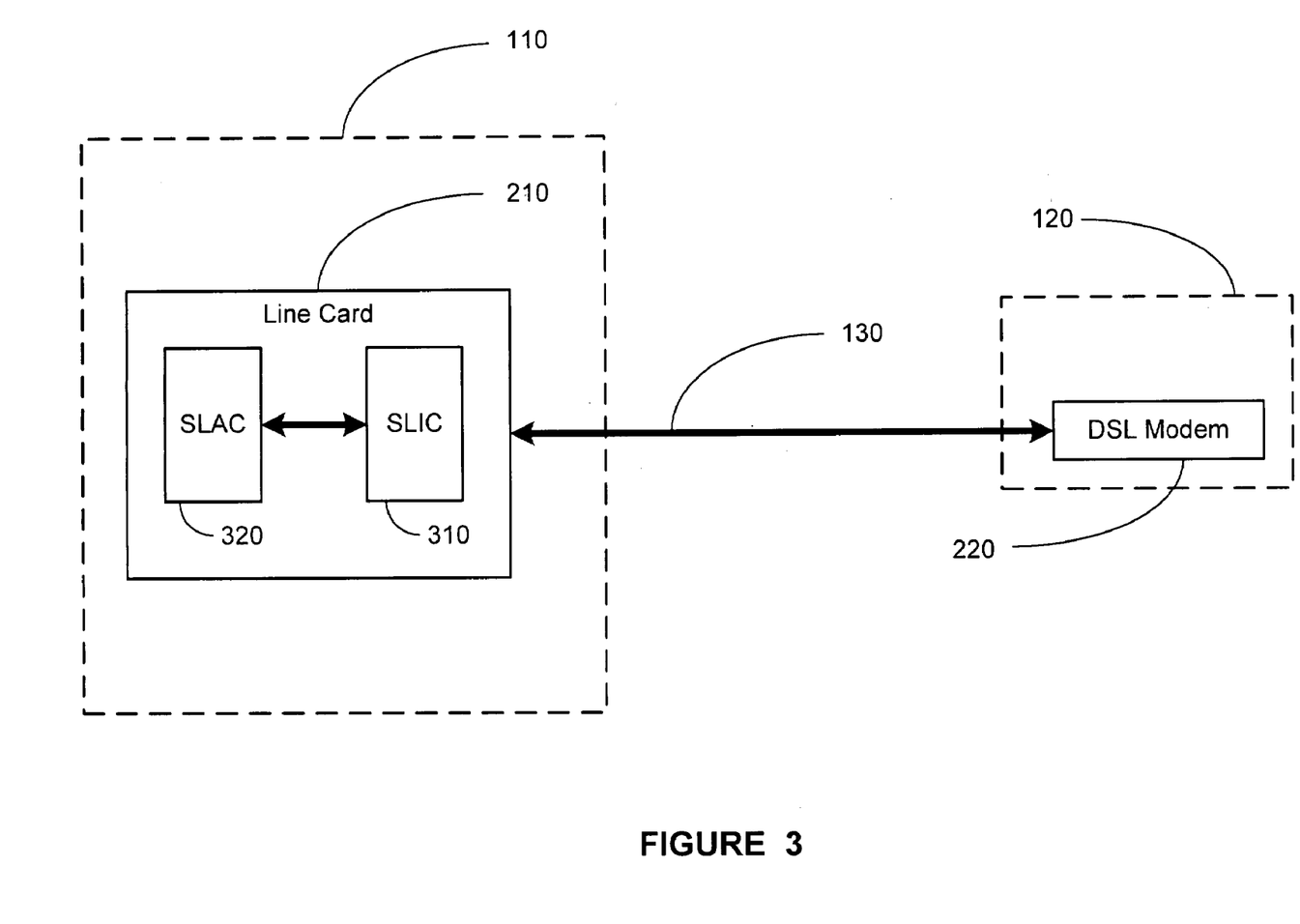
FIG. 3 illustrates a more detailed depiction of the line card in accordance with one illustrative embodiment of the present invention.

Turning now to FIG. 3, one embodiment of the line card 210 is illustrated. In one embodiment, the line card 210 comprises a subscriber line interface circuit (SLIC) 310 as well as a subscriber line audio-processing circuit (SLAC) 320. The SLIC 310 performs a variety of interface functions between the line card 210 and the subscriber line 130. The SLIC 310 is also capable of performing a variety of functions, such as battery feed, overload protection, polarity reversal, on-hook transmission, and current limiting. The SLIC 310 is connected to the SLAC 320. The SLAC 320 is capable of processing analog-to-digital (A/D) and digital-to-analog (D/A) signal conversion, filtering, feed control, and supervision.

Figure 4:
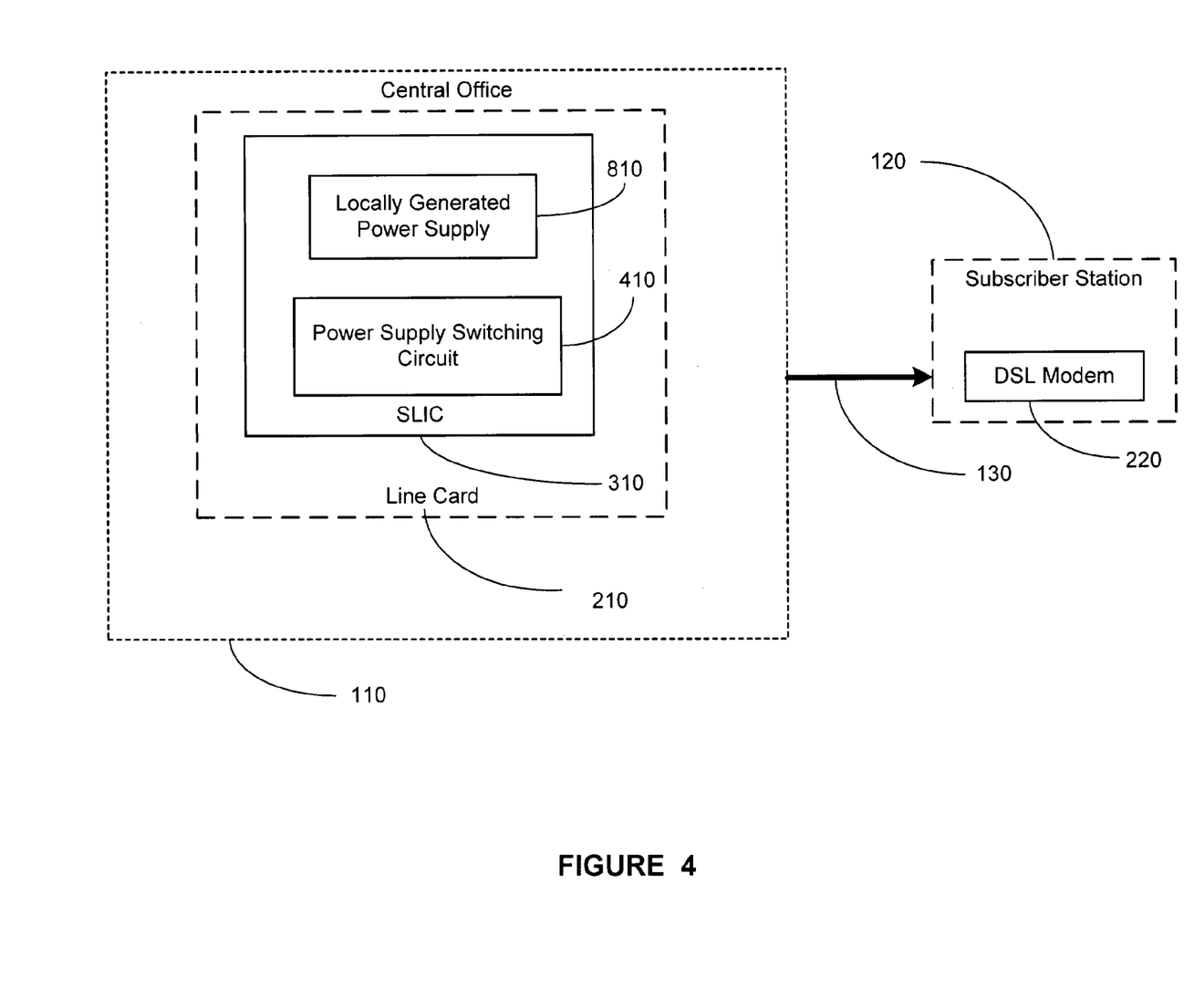
FIG. 4 illustrates a simplified block diagram depiction of the SLIC described in FIG. 3, in accordance with one illustrative embodiment of the present invention.

Turning now to FIG. 4, a more detailed description of the line card 210 in accordance with one embodiment of the present invention is illustrated. In one embodiment, the SLIC 310 comprises a power supply switching circuit 410. The power supply switching circuit 410 is capable of switching the power supplies utilized by the SLIC 310. Utilizing the power supply switching circuit 410, the SLIC 310 is able to perform telecommunication operations with a large voltage across the SLIC 310, yet only expose devices within the SLIC 310 to only 150 volts or less. The power supply switching circuit 410 is capable of tracking a ringing signal received by the SLIC 310 and switch power sources to devices within (e.g., amplifiers, diodes, switches, etc.) the SLIC 310, such that voltages across the devices are within control limits (e.g., equal or under 150 volts). Additionally, the SLIC 310 may comprise a locally generated power supply circuit 810 to provide various power supplies for the operation of the SLIC 310. The locally generated power supply circuit 810 provides for using a single power supply in a dual mode by providing a plurality of power supplies at various time periods. More detailed illustrations and descriptions of the implementation of the power supply switching circuit 410 and the locally generated power supply circuit 810 in the SLIC 310 are provided in FIGS. 5–8 and accompanying description below.

Figure 5:
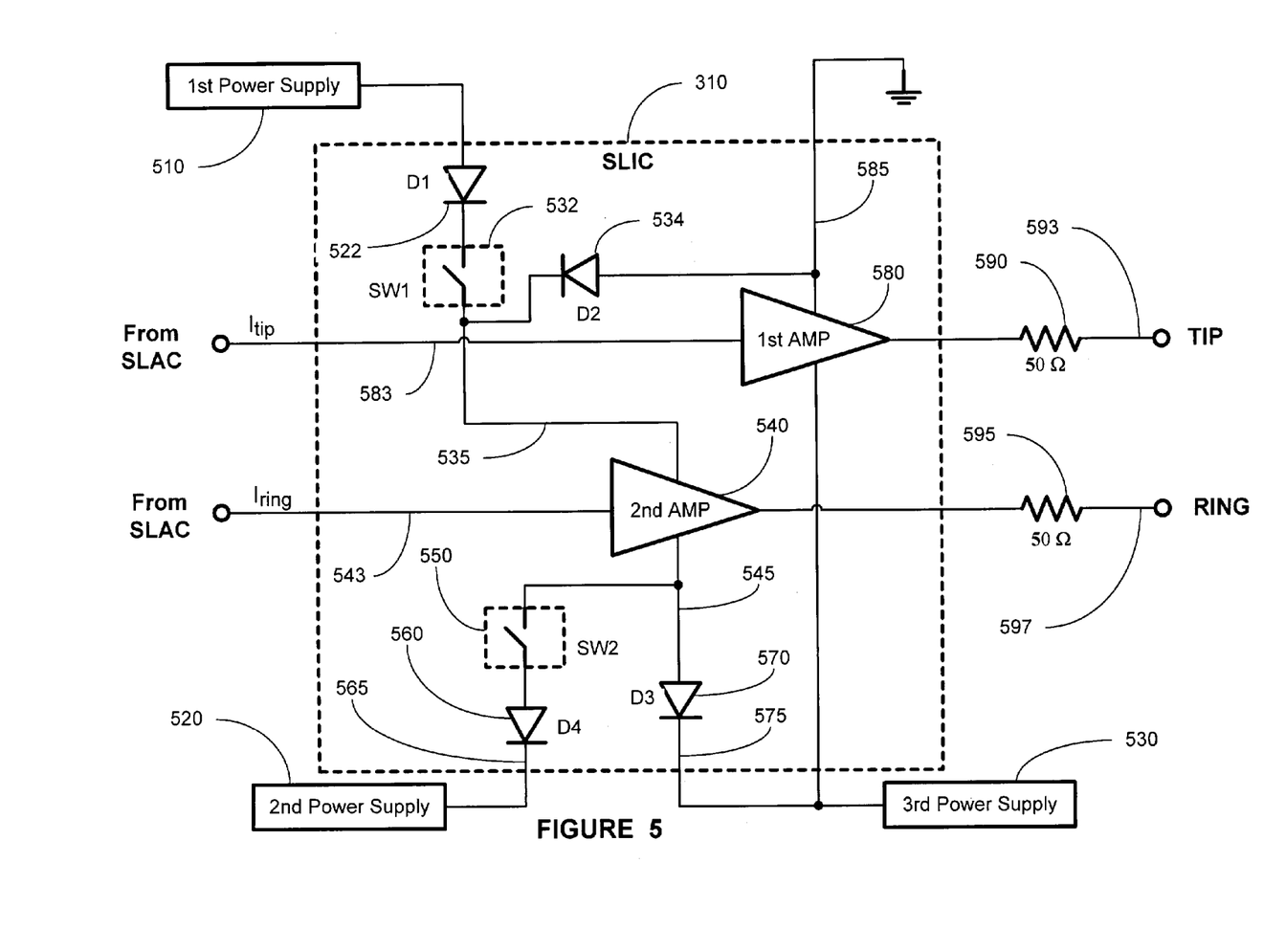
FIG. 5 illustrates a block diagram depiction of a power supply switching circuit in the SLIC of FIG. 4, in accordance with one illustrative embodiment of the present invention.

Turning now to FIG. 5, one embodiment of the implementation of the power supply switching circuit 410 into the SLIC 310 is illustrated. The SLIC 310 illustrated in FIG. 5 is tied to a first power supply 510, a second power supply 520, and to a third power supply 530. In one embodiment, the first power supply 510 may be a 100 Volts supply, the second power supply 520 may be a −200 Volts supply, and the third power supply 530 may be a −48 Volts or a −50 Volts power supply. The SLIC 310 comprises a first amplifier 580, which receives a tip current ($I_{tip}$) from the SLAC 320 on a line 583. The output of the amplifier 580 is coupled to a first terminal of a resistor 590, whose second terminal is coupled to a tip node on the line 593. The resistor 590 may be a 50 Ohms resistor. The SLIC 310 may also comprise a second amplifier 540, which receives a ring current signal ($I_{ring}$) from the SLAC 320 on a line 543. The output of the second amplifier 540 is coupled to a first terminal of a resistor 595, whose second terminal is coupled to a ring node via the line 597. The resistor 595 may be a 50 Ohms resistor.

The first power supply 510 is tied to an anode terminal of a first diode 522 (D1), whose cathode terminal is coupled to a first terminal of a first switch 532 (SW1). A second terminal of the first switch 532 is coupled to the cathode terminal of a second diode 534 (D2). The anode terminal of the diode 534 is coupled to ground via a line 585. The node connecting the cathode terminal of the second diode 534 and second terminal of the first switch 532 is connected to the positive supply of the second amplifier 540 via a line 535. The negative supply of the second amplifier 540, on a line 545, is coupled to a first terminal of a second switch 550, as well as to an anode terminal of a third diode 570 (D3). The cathode terminal of the diode 570 is coupled to the third power supply 530, which may be a −50 Volts power supply, via a line 575. A second terminal of the second switch 550 is coupled to an anode terminal of a fourth diode 560 (D4), whose cathode terminal is coupled to the second power supply 520, which may be a −200 Volts power supply, via a line 565. The positive power supply of the first amplifier 580, which receives the current tip signal $I_{tip}$ on the line 583, is coupled to ground via the line 585. The negative supply for the first amplifier 580 is coupled to the third power supply 530.

The SLIC 310 in the illustrated embodiment of FIG. 5 may be operated by using a +100 Volt supply (the first power supply 510) and a −200 Volt power supply (the second power supply 520) and a −50 Volts power supply (the third power supply 530). When the first switch 532 is closed, the positive power supply of the second amplifier 540 (on the line 535) will pull up to +100 Volts via the switch 532 and the first diode 522, which would then be forward biased. When the first switch 532 is open, the positive power supply of the second amplifier 540 (on the line 535) will go to ground because of the second diode 534, which will provide a connection to ground on the line 585, reverse biasing the second diode 534.

When the first switch 532 is open, the maximum voltage across the first switch 532 is +100 Volts because the first terminal of the first switch 532 would be connected to the first power supply 510 and the second terminal of the first switch 532 would be connected to ground via the second diode 534. Therefore, neither the first switch 532 nor the second diode 534 will ever experience a voltage more than +100 Volts, even though there is a differential of 300 Volts across the SLIC 310.

The second power supply 520 may be set at −200 Volts and the third power supply 530 may be −50 Volts. When the second switch 550 is open, the negative supply of the second amplifier 540 (on the line 545) would be connected to −50 Volts via the third diode 570. At this point, the voltage across the second switch 550 would be a maximum of 150 Volts since the second terminal of the second switch 550 is connected to the second power supply 520 (−200 Volts) via the fourth diode 560, and the first terminal of the switch 550 would be connected to the −50 Volts power supply via the third diode 570. Therefore, the maximum voltage seen by the second switch 550 would be −200 Volts minus −50 Volts, which is −150 Volts. If the second switch 550 is closed, this will pull down the second switch 550 to −200 Volts onto the second switch 550 and the reverse biased voltage on the fourth diode 560 would be −150 Volts. Therefore, neither of the switches 532, 550, nor the diodes 522, 560 would experience a voltage more than 150 Volts. Components utilized in embodiments of the present invention generally utilize dielectrically isolated technology, which provides that transistors utilized in components are independent and the breakdown of substrate would not come into effect. The first and second switches 532, 550 may be controlled to be reactive to the variations in the input signals received by the SLIC 310, such as the ringing signal on the line 543.

Referring to the second amplifier 540, if a ringing signal is received on the line 543, when the ring output voltage is between −50 Volts and 0 Volts, the first and second switches 532, 550 are open and the second amplifier 540 will be powered from ground (on its positive supply) and −50 Volts (on its negative supply). Therefore, in this scenario, there are only 50 Volts across the second amplifier 540. On the positive cycle of the ring signal on the line 543, the ring output voltage is above 0 Volts. Therefore, the first switch 532 will be closed and the second amplifier 540 will be powered from −50 (on its negative supply) and +100 Volts (on its positive supply). Hence, during this time period, there is a 150 Volts across the second amplifier 540.

When the ring output voltage becomes below −150 Volts, the second switch 550 will be closed and the first switch 532 will be open, thus the second amplifier 540 will be powered from 0 Volts (on its positive supply) and −200 Volts (on its negative supply). Therefore, during this scenario, the second amplifier 540 experiences 200 Volts differential. However, this is the only case where any component in the SLIC 310 illustrated in FIG. 5 experiences a voltage greater than 150 Volts. A solution to this is to implement a third switch, which is discussed in more detail in FIG. 7 and accompanying description below. Utilizing the implementation of the switches 532, 560 and diodes 522, 534, 560, 570 described above, a SLIC 310 that experiences a 300 Volts difference would operate with 150 Volts across any device within the SLIC 310 by utilizing the switching scheme based upon the signal received on the tip node (on the line 583) or on the ring node (on the line 543).

Figure 6:
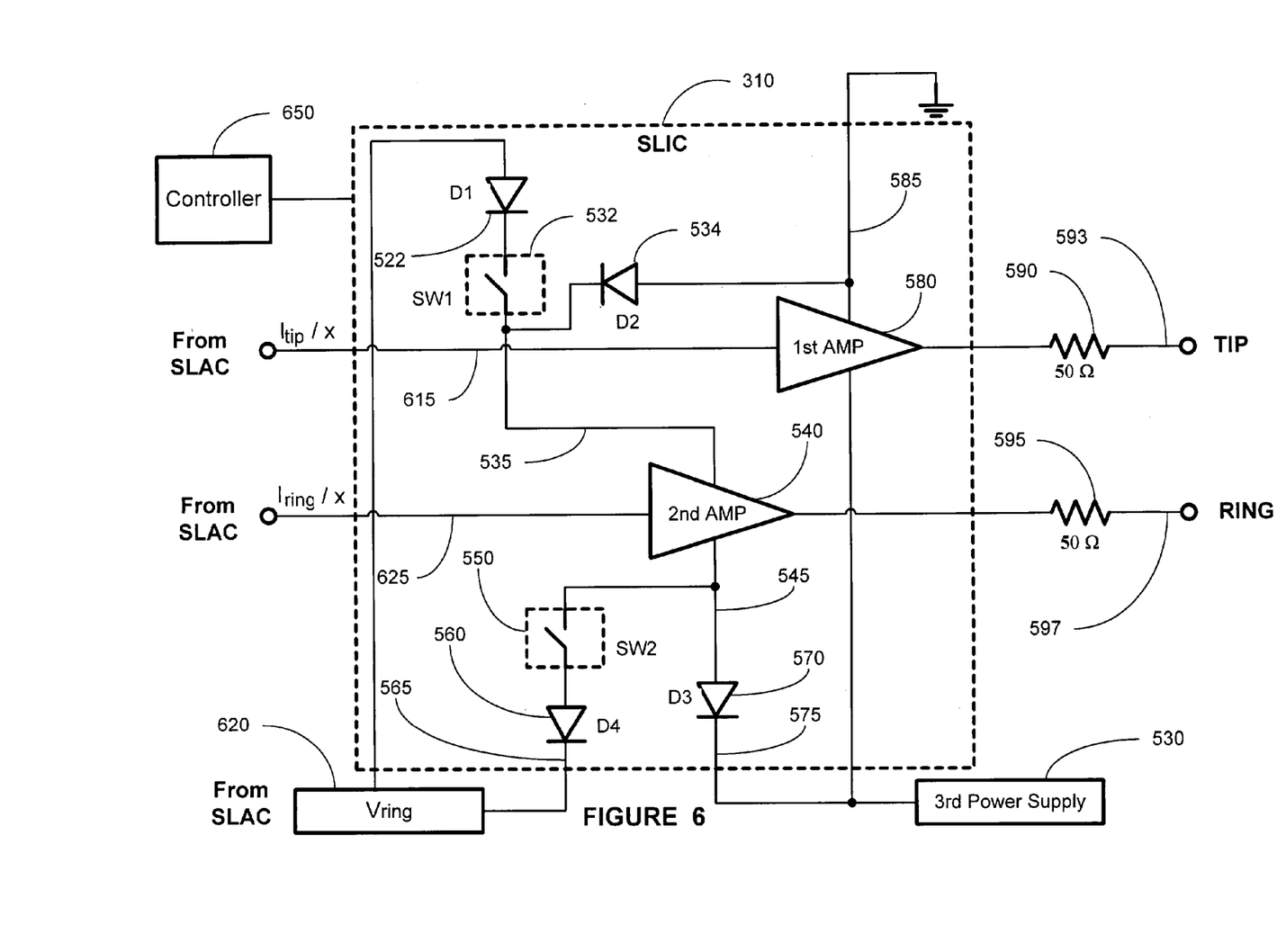
FIG. 6 illustrates an first alternative method of implementing the power supply switching circuit of FIG. 4, in accordance with one illustrative embodiment of the present invention.

Turning now to FIG. 6, an alternative embodiment of implementing the unbalanced SLIC 310 using the ring signal as a power supply is illustrated. Instead of utilizing an extra power supply, this implementation utilizes the ring signal ($V_{ring}$ 620) from the SLAC 320 as the power source for the operation of the SLIC 310. Rather than a remote telephone equipment providing the +100 and the −200 Volt power supplies, e.g., the first power supply 510 and the second power supply 520, the power from the ring signal ($V_{ring}$ 620) and the third power supply 530 (−50 Volts) may be used to drive the operation of the SLIC 310. The input of the first amplifier 580 receives a tip current signal $I_{tip}$ on the line 615 that is adjusted by a factor of X ($I_{tip}/X$), where X may be 500, by the SLAC 320. A factored ring signal is sent to the second amplifier 540 on a line 625. Additionally, the input of the second amplifier 540 receives a ring signal that is factored by X ($I_{ring}/X$), where X may be 500, by the SLAC 320. This factored ring signal is sent to the second amplifier 540 on a line 625.

A ring signal generated in the SLAC 320 ($V_{ring}$ 620) may provide the power needed for the operation of the SLIC 310. When there is a ringing signal, the first and second switches 532, 550 are generally closed during the activation of the ringing signal. When there is not a ringing signal, the first and second switches 532, 550 are open and the second amplifier 540 operates from 0 Volts to −48 Volts due to the connection from the second diode 534 to ground on the line 585 on the positive supply of the second amplifier 540, and the connection from the negative power supply of the second amplifier 540 to the third power supply 530 via the third diode 570. When not ringing (i.e., the ringing signal is not active), the second amplifier 540 experiences a 50 volts differential. Additionally, the first amplifier 580 is coupled to ground via a line 585 on the positive supply terminal and the negative supply terminal is connected to the third power supply 530. Therefore, the first amplifier 580 experiences only a −48 or −50 volts differential.

When the ringing signal is activated (i.e., $V_{ring}$ 620 and/or $I_{ring/X}$ on the line 625 are active), the first and second switches 530, 550 are closed. The first and second switches 532, 550 may be closed automatically (by tracking the ringing signal) without a separate control signal. During the time period that the ring waveform ($V_{ring}$ 620 and/or $I_{ring}$ on the line 625) are below −50 Volts, the negative supply terminal of the second amplifier 540 on the line 545 will track the ringing waveform. When the ringing waveform is above 50 Volts, the negative supply terminal of the second amplifier 540 on the line 545 will be clamped at −50 Volts. The negative supply terminal of the second amplifier 540 is automatically switched by the third and fourth diodes 560, 570 by the ringing waveform on the line 625 and the voltage supplied by the $V_{ring}$ supply 620.

The positive supply terminal of the second amplifier 540 will be at 0 Volts and will track the positive supply when the $V_{ring}$ supply 620 is above ground. Therefore, the power supply terminal automatically causes switching of the second amplifier 540. Hence, if the ringing output voltage tracks the ringing signal when it is below −50 Volts, the ringing output voltage signal will track the power supply and will come back up. When the power supply $V_{ring}$ 620 is above −50 Volts, the positive supply terminal of the amplifier 540 is using 0 Volts and this terminal will use 0 and −50 Volts. When the positive supply terminal gets above ground it will automatically switch to the higher power supply and track it. The ring signal may be placed into a controller 650, such that ringing may be controlled and sent to the SLIC 310 so the ringing and the SLIC 310 follow the power supply. Therefore, the time period where any component in the SLIC 310 experiences greater than 150 Volts generally occurs only when the $V_{ring}$ supply signal is below −150 Volts. Additionally, the variable power supply ($V_{ring}$ 620) is less power consuming than the fixed power supply (the first and second power supplies 510, 520). The condition described above where the second amplifier 540 experiences a voltage greater than 150 Volts is solved by implementing a third switch as illustrated in FIG. 7.

Figure 7:
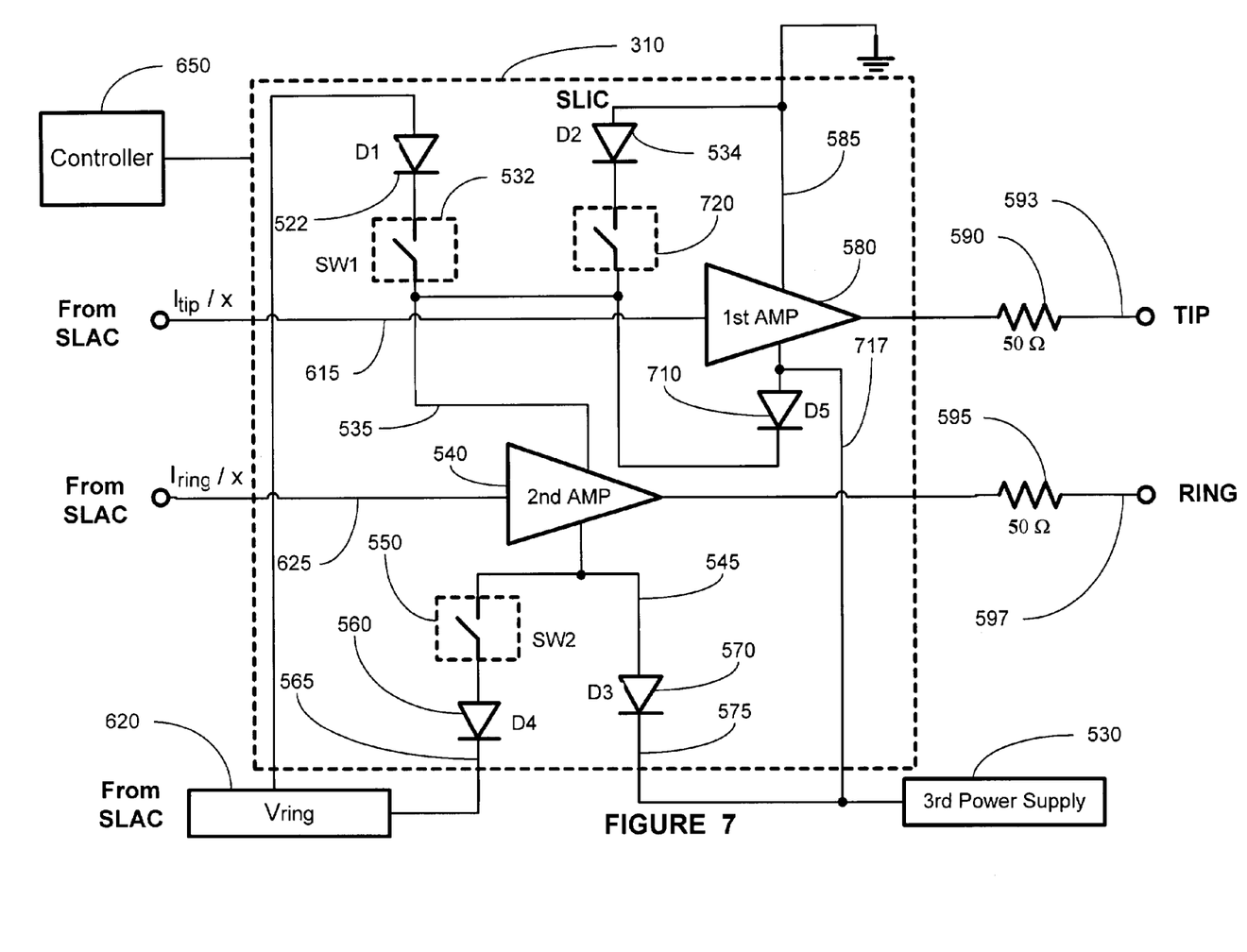
FIG. 7 illustrates a second alternative method of implementing the power supply switching circuit of FIG. 4, in accordance with one illustrative embodiment of the present invention.

Turning now to FIG. 7, an alternative implementation of the embodiment of the present invention is illustrated. The implementation of the components shown in FIG. 7 is similar as that of the implementation of the circuit shown in FIG. 6, with the addition of a third switch 720 and a fifth diode 710. The second diode 534 is coupled to ground via its anode terminal on a line 585. The cathode terminal of the second diode 534 is coupled to the third switch 720, whose second terminal is coupled to the positive supply terminal of the second amplifier 540.

The negative supply terminal of the first amplifier 580 is coupled to the third power supply 530 on a line 717 and to the anode terminal of the fifth diode 710, whose cathode terminal is coupled to the positive supply terminal of the second amplifier 540. During the ringing activation of the ringing signal on the line 625 and the ring voltage ($V_{ring}$ 620), when the ringing signal is below 0 Volts, the third switch 720 affects the positive supply terminal of the second amplifier 540. When the ring voltage ($V_{ring}$ 620) goes below −150 Volts, the activation of the third switch 720 becomes open. When it opens, the third switch 720 replaces the connection to ground on the positive supply terminal of the second amplifier 540 with a connection to −50 Volts using the third power supply 530 via the fifth diode 710.

As described above, the reason that greater than a 150 Volts differential appeared on the second amplifier 540 was that at certain time periods, the positive supply terminal was at ground and the negative supply would go below −150 Volts (e.g., −200 Volts). When the negative supply terminal of the second amplifier 540 on the line 545 is more negative than −150 Volts, then the positive supply terminal of the second amplifier 540 is switched to −50 Volts via the fifth diode 710 by the opening of the third switch 720. So the maximum negative voltage (i.e., −200 Volts) of the ring signal would not cause the total voltage differential across the second amplifier 540 to be above 150 Volts, since −200 Volts (on the negative supply terminal of the second amplifier 540) minus −50 Volts (on the positive supply terminal of the second amplifier 540) would result in −150 Volts across the second amplifier 540. Therefore, the voltage across the second amplifier 540 would not exceed 150 Volts. Therefore, utilizing embodiments of the present invention, none of the components/devices in the SLIC 310 would experience a voltage greater than 150 Volts at any given time period during the operation of the SLIC 310. The SLIC 310 may be entirely implemented using an unbalanced ringing configuration using only devices that are rated at 150 Volts or lower, despite the fact that a 300 Volts differential is experienced by the SLIC 310.

An additional power supply may be implemented to embodiments of the present invention if a local supply is not available. A circuit may be implemented such that two supplies, i.e., the first power supply 510 and the second power supply 520 may be created.

Figure 8:
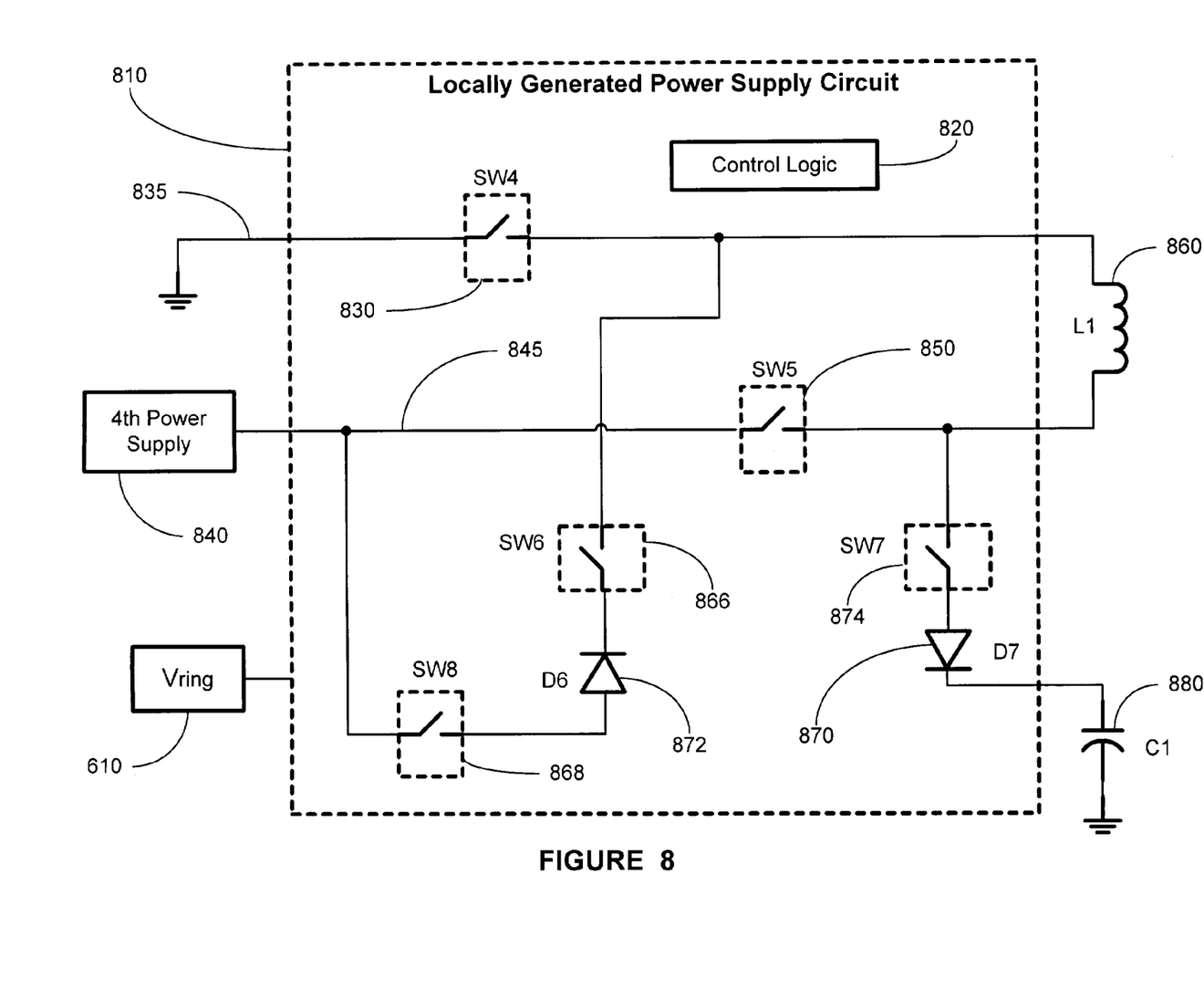
FIG. 8 illustrates a circuit for providing a dual power supply signal using a single input.

Turning now to FIG. 8, a locally generated power supply circuit 810 that provides two power supplies utilizing a single input in accordance with embodiments of the present invention is illustrated. The two supplies equivalent to the first and the second power supplies 510, 520 may be generated locally by the locally generated power supply circuit 810. The locally generated power supply circuit 810 illustrated in FIG. 8 comprises a control logic 820 that is capable of controlling the operation of various switches in the circuit 810. The circuit 810 may comprise a fourth switch 830 (SW4), a fifth switch 850 (SW5), a sixth switch 866 (SW6), a seventh switch 874 (SW7), and an eighth switch 868 (SW8). The circuit 810 receives power from a fourth power supply 840 via a line 845. The fourth power supply 840 may be a −48 Volts power supply. The locally generated power supply circuit 810 is tied to a ringing generator in the SLAC 320 and tracks the ringing signal ($V_{ring}$ 620 and/or $I_{ring}/X$ 625). Using the fourth power supply 840 and the ringing signal ($V_{ring}$ 620 and/or $I_{ring}/X$ 625), the locally generated power supply circuit 810 provides a waveform power supply that may be used by the various devices/circuits illustrated embodiments herein.

The waveform power supply concept, which provides power signal in a waveform format, may be implemented by the locally generated power supply circuit 810 since in embodiments of the present invention, a positive supply and a negative supply did not need to coexist at the same instant in time. Therefore, a waveform power supply concept may be used that supplies the positive and the negative supply as needed (i.e., a positive supply in a different time period and a negative supply in another time period) by the circuits/devices provided in the present invention. Therefore, a signal supply that is of a particular waveform when it is above ground is always more positive than the ring signal ($V_{ring}$ 620 and/or $I_{ring}/X$ 625). Additionally, the power output signal from the locally generated power supply circuit 810 would be below −50 Volts if it were more negative than the ring signal ($V_{ring}$ 620 and/or $I_{ring}/X$ 625). When the waveform power output signal from the circuit 810 is between 0 and 50 Volts, it may not be used by the circuits of the present embodiment.

The power supply waveform is formed by controlling the activation of the switches in the locally generated power supply circuit 810, which may be performed by the control logic 820. A −48 Volt power supply (fourth power supply 840) is provided to an input terminal of the fifth switch 850, which is coupled to a terminal of the inductor 860. In one embodiment, the inductor 860 may receive the ringing signal ($V_{ring}$ 620 and/or $I_{ring}/X$ 625) from the SLAC 320. In an alternative embodiment, the ringing signal ($V_{ring}$ 620 and/or $I_{ring}/X$ 625) may be received by the circuit 810 in a different manner, such as direct wired connection. A ground terminal on a line 835 is coupled to a terminal of the fourth switch 830, whose output terminal is coupled to the second terminal of the inductor 860. The second terminal of the inductor 860 is also coupled to a terminal of the sixth switch 866, which is coupled to the cathode terminal of a sixth diode 872 (D6). The anode terminal of the sixth diode 872 is coupled to a first terminal of the eighth switch 868, whose second terminal is coupled to the fourth power supply 840.

The first terminal of the inductor 860 is coupled to the second terminal of the fifth switch 850 and coupled to a first terminal of the sixth switch 866, whose second terminal is coupled to the anode terminal of a diode 870. The cathode terminal of the diode 870 is coupled to a positive terminal of a capacitor 880 (C1), whose negative terminal is coupled to ground. In one embodiment, the waveform power output signal from the circuit 810 may be provided across the capacitor 880. In an alternative embodiment, the waveform power output signal from the circuit 810 may be provided from other nodes of the circuit 810.

Using the control logic 820, the switches in the circuit 810 are controlled such that the single power supply −48 Volts in conjunction with the ringing signal ($V_{ring}$ 620 and/or $I_{ring}/X$ 625) is used to generate a positive and negative power supply, which may provide the +100 power voltage equivalent to the first power supply 510 and the −200 Volt power supply equivalent to the second power supply 520 at appropriate time periods.

The minimum order of the DC supplies provided in embodiments of the present invention may be equal to the applied voltage divided by the transistor breakdown voltage. If a 300 Volt differential across a SLIC 310 is needed, and 150 Volt technology devices are implemented, the minimum number of supplies needed would be +150, −150 Volts and the third supply that has a voltage in between 150 and −150 Volts. If there is an AC supply, then the AC supply and ground is only needed. Total voltage is limited by the trench or isolation breakdown of the devices, which may be 5 to 600 Volts. This technique provided by the embodiments of the present invention may be used with 110 or 240 Volt RMS supplies directly from the power supplies. Utilizing embodiments of the present invention, both positive and negative supplies may be replaced by one ringing generator with one power supply as illustrated in FIG. 8. This is made possible by the fact that the devices utilized in the SLIC 310 are generally experiencing 150 Volts at any given time across the devices. Therefore, both supplies need not be present at the same time when running 150 Volts across the devices in the SLIC 310.

The present invention provides for an implementation of an unbalanced ringing SLIC. Utilizing embodiments of the present invention relays may be eliminated and the silicon technology only has to support 150 Volts across various devices in the SLIC 310. Furthermore, existing ringing supplies may be reused to reduce power dissipation. Alternatively, DC supplies may be used to reduce power dissipation.

Although for illustrative purposes, embodiments of the present invention have been discussed in the context of a line driver application, the amplifier arrangements taught by embodiments of the present invention is not limited to line driver applications. The concepts taught by embodiments of the present invention may be utilized in a variety of electronic applications. The apparatuses 110, 120, 130 may be integrated in a system capable of transmitting and receiving signals having a voice band and/or a data band. The teachings of the present invention may be implemented in a line card 210 that supports POTS technology, ADSL technology, and/or similar technologies. The teachings of the present invention may also be implemented in various other electronics applications.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving a ringing signal;
   providing a waveform power supply signal based upon said ringing signal; and
   performing an unbalanced output buffering function upon said signal to be conditioned using an unbalanced buffering circuit, performing said unbalanced output buffering function comprising switching between a plurality of power levels of said waveform power supply signal to maintain a predetermined maximum voltage across a plurality of devices relating to said unbalanced buffering circuit.

2. The method of claim 1, wherein providing a waveform power supply signal based upon said ringing signal further comprises providing a first and a second power supply by switching between a constant voltage supply and said ringing signal by tracking the transition of said ringing signal.

3. The method of claim 2, wherein providing said first and said second power supply further comprises providing said first power supply that is about 100 Volts and said second power supply that is about −200 Volts.

4. The method of claim 1, further comprising:
   receiving said ringing signal through an inductor;
   receiving a constant power supply; and
   switching between said ringing signal and said constant power supply to provide a first power supply and a second power supply.

5. An apparatus, comprising:
   means for receiving a ringing signal;
   means for providing a waveform power supply signal from upon said ringing signal; and
   means for performing an unbalanced output buffering function upon said signal to be conditioned using an unbalanced buffering circuit, performing said unbalanced output buffering function comprising switching between a plurality of power levels of said waveform power supply signal to maintain a predetermined maximum voltage across a plurality of devices relating to said unbalanced buffering circuit.

6. An apparatus, comprising:
   a circuit to provide a waveform power supply signal from upon a ringing signal and a constant power supply, said waveform power supply signal to provide a plurality of power supplies for providing operating voltages for operating a plurality of devices; said circuit comprising a plurality of switches to maintain a predetermined maximum voltage across said devices.

7. The apparatus of claim 6, wherein said constant power supply provides about −50 Volts.

8. The apparatus of claim 7, wherein said waveform power supply signal provides a first power supply and a second power supply.

9. The apparatus of claim 8, wherein said first power supply provides about 100 Volts and said second power supply provides about −200 Volts.

10. The apparatus of claim 6, further comprising:
    a first amplifier for receiving and conditioning a tip signal; and
    a second amplifier for receiving and conditioning said ringing signal.

11. The apparatus of claim 6, wherein said circuit comprising:
    an inductor;
    a plurality of diodes;
    a capacitor for providing an output supply voltage;
    a plurality of switches for switching from said constant power supply, a ground signal, and said ringing signal to provide said waveform power signal; and
    a controller for controlling the operation of said plurality of switches to generate said waveform power signal.

12. The apparatus of claim 11, wherein said predetermined maximum voltage is about 150 Volts.

13. A system, comprising:
    a subscriber line; and
    a line card electronically coupled with said subscriber line, said line card comprising:
    a first amplifier for receiving and conditioning a tip signal;
    a second amplifier for receiving and conditioning a ringing signal; and
    a circuit to provide a waveform power supply signal from upon said ringing signal and a constant power supply, said waveform power supply signal to provide a plurality of power supplies for providing operating voltages for operating said first and second amplifiers; said circuit comprising a plurality of switches to maintain a predetermined maximum voltage across said first and second amplifiers.

14. The system of claim 13, wherein said first amplifier, said second amplifier, and said circuit are positioned on a ringing subscriber line interface circuit (SLIC).

15. The system of claim 13, wherein said constant power supply provides about −50 Volts.

16. The system of claim 15, wherein said waveform power supply signal provides a first power supply and a second power supply.

17. The system of claim 16, wherein said first power supply provides about 100 Volts and said second power supply provides about −200 Volts.

18. The system of claim 13, wherein said circuit comprising:
    an inductor;
    a plurality of diodes;
    a capacitor for providing an output supply voltage;
    a plurality of switches for switching from said constant power supply, a ground signal, and said ringing signal to provide said waveform power signal; and
    a controller for controlling the operation of said plurality of switches to generate said waveform power signal.

19. The system of claim 18, wherein said predetermined maximum voltage is about 150 Volts.

20. A computer readable program storage device encoded with instructions that, when executed by a computer, performs a method, comprising:
    receiving a ringing signal;
    providing a waveform power supply signal from upon said ringing signal; and performing an unbalanced output buffering function upon said signal to be conditioned using an unbalanced buffering circuit, performing said unbalanced output buffering function comprising switching between a plurality of power levels of said waveform power supply signal to maintain a predetermined maximum voltage across a plurality of devices relating to said unbalanced buffering circuit.

21. The computer readable program storage device encoded with instructions that, when executed by a computer, performs the method of claim 20, wherein providing a waveform power supply signal based upon said ringing signal further comprises providing a first and a second power supply by switching between a constant voltage supply and said ringing signal by tracking the transition of said ringing signal.

22. The computer readable program storage device encoded with instructions that, when executed by a computer, performs the method of claim 21, wherein providing said first and said second power supply further comprises providing said first power supply that is about 100 volts and said second power supply that is about −200 Volts.

23. The computer readable program storage device encoded with instructions that, when executed by a computer, performs the method of claim 20, further comprising:
  receiving said ringing signal through an inductor;
  receiving a constant power supply; and
  switching between said ringing signal and said constant power supply to provide a first power supply and a second power supply.

* * * * *